INVENTORS.
BILLY E. CLAYBAUGH, JOHN R. GRIFFIN, &
ALBERT T. WATSON,

BY

ATTORNEY.

United States Patent Office 3,472,829
Patented Oct. 14, 1969

3,472,829
PROCESS FOR BROADENING THE MOLECULAR WEIGHT DISTRIBUTION IN POLYMERS
Billy E. Claybaugh, John R. Griffin, and Albert T. Watson, Baytown, Tex., assignors to Esso Research and Engineering Company
Continuation-in-part of application Ser. No. 408,562, Nov. 3, 1964. This application June 10, 1968, Ser. No. 735,831
Int. Cl. C08f 1/56
U.S. Cl. 260—93.7      21 Claims

ABSTRACT OF THE DISCLOSURE

The molecular weight distribution of polyolefins produced in a Ziegler-catalyzed system is controlled by introducing hydrogen at a controlled and varying rate. The pattern of hydrogen addition produces a corresponding pattern of average molecular weight of instantaneous polymer production and a corresponding distribution of molecular weights. For example, where the empirically determined relationship between molecular weight and the rate of hydrogen addition is expressed as:

$$M = \frac{\sqrt{H}}{A}$$

Figure 1:
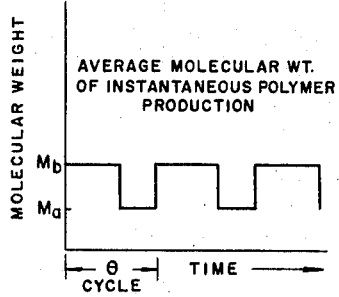

an even distribution of molecular weights (FIG. 3B) can be obtained by using a hydrogen rate (FIG. 3A) expressed as:

$$H = \frac{A^2}{\left[M_a + (M_b - M_a)\left(\frac{t}{\theta}\right)\right]^2}$$

which causes the average molecular weight of instantaneous polymer production (FIG. 3) to follow the relationship:

$$M = M_a + (M_b - M_a)\left(\frac{t}{\theta}\right)$$

In the above equations, the variables are as follows:

M is the average instantaneous molecular weight at time $t$;
$M_a$ is the minimum average molecular weight;
$M_b$ is the maximum average molecular weight;
H is the instantaneous rate of hydrogen addition;
$t$ is the time at which the relationship is to be determined;
$\theta$ is the length of one cycle; and
A is an empirically determined constant.

Other distributions are shown in the figures.

RELATED APPLICATIONS

This application is a continuation-in-part of our copending application Ser. No. 408,562, filed Nov. 3, 1964 and now abandoned.

DISCUSSION

The present invention relates to a process for modifying the molecular weight distribution in polyolefins produced in a Ziegler-catalyzed system. More particularly, the present invention is directed to a method of modifying the molecular weight distribution in polypropylene produced in contact with a Ziegler catalyst, by a process involving the introduction of hydrogen into the reaction zone during repeated cycles, the addition rate varying during each of said cycles.

It has been found that by physically admixing and extruding two polypropylenes having widely different average molecular weights, a polymer of superior flow properties can be obtained. However, the operation of pellet or powder blending of polypropylenes having such disparate average molecular weights has several obvious processing disadvantages. It requires blending and extrusion equipment and personnel, necessitates considerable additional product testing, and additional extrusions of the mixed polymer may be required in order to insure the utmost homogeneity in the product for uses such as polypropylene film.

The present invention deals with a process for producing in a single reactor a polymer product which has all of the advantages of a blend of different molecular weight polymers, but without the processing disadvantages inherent in the physical blending of two polyolefin products. While polypropylene is a specific example of a product which can be produced by the present invention copolymers of alpha olefins such as ethylene and propylene, etc., can also be produced having a controlled molecular weight distribution. An exemplary operation can be described in broad terms as follows:

To a reactor producing polypropylene (for example) by the Ziegler catalysts system, a stream of hydrogen is added at two levels alternately, that is, as a square-wave function. The instantaneous average molecular weight will also follow a square-wave function. Each half cycle produces a specific average molecular weight polymer equivalent to a steady-state operation. The resulting effluent from the reactor is an extremely intimate homogeneous mixture of the two polymer products. The time interval or period of each cycle as well as the hydrogen concentration can be adjusted to offer the maximum flexibility in relative quantity and average molecular weights of the components constituting the blend. A logical extension of hydrogen addition following the square-wave function involves adding hydrogen at a rate which produces average molecular weights which follow a sine wave, a sawtooth wave, multilevel waves, or a square-root function, in order to obtain polymer products of desired molecular weight distributions.

In each of these variants, the rate of hydrogen addition will vary during each cycle from a minimum as low as 0 to a maximum as great as 800 p.p.m. based upon monomer feed.

The use of hydrogen as a molecular weight controlling agent is well known. Hydrogen acts as a chain transfer agent, and it has been found that a close correlation between the hydrogen concentration and the average molecular weight of polymer which is produced follows a relatively constant curve for any given installation. Particularly, in the liquid phase polymerization reaction utilizing a hydrocarbon solvent, the hydrogen gas acts almost instantaneously in its molecular weight control function. Since the monomer is charged at a substantially constant rate, the control of hydrogen addition serves as a direct control on the concentration of hydrogen within the reaction zone, and thereby controls the molecular weight of polymer which is being produced at any given time.

The cycle frequencies are chosen to avoid a frequency so high that the system cannot respond to the desired input signal. This would result in a molecular weight distribution corresponding to the average hydrogen being introduced (in the extreme), and some damped response for intermediate cases. One would also avoid a frequency so low as to yield a cycle extending beyond one residence time in length (which would produce a polymer having molcular weight distributions varying with time). By avoiding these extremes, a product from the reaction zone can be obtained which (in the case of square-wave addition) substantially represents a highly intimate blend of (1) polypropylene having a low molecular weight with (2) polypropylene having a very high molecular weight. In effect, the distribution of average molecular weights is in that case modified in order to give more polymer of high and low molecular weights, and less polymer of the intermediate molecular weights.

The distribution of molecular weight averages for each type of hydrogen addition is set forth in FIG. 1 through FIG. 4B.

In order to obtain the desired distribution of polymer molecular weight, it is necessary to choose a hydrogen addition rate which follows a pattern devised to produce the desired type of curve for the instantaneous average molecular weight of the polymer being produced. The pattern of hydrogen addition will not be identical to the pattern of the average molecular weight of instantaneous polymer production, because the instantaneous average molecular weight is not directly proportional to the amount of hydrogen added and is an inverse function of the amount of hydrogen added. Generally, the instantaneous average molecular weight is an inverse square root function of the hydrogen addition rate. This relationship between the instantaneous average molecular weight and the rate of hydrogen addition can be empirically determined for a given installation, and the proper hydrogen addition pattern corresponding to the desired pattern of instantaneous average molecular weights can be derived from the empirical relationship.

For example, in some installations the relationship between molecular weight and the rate of hydrogen addition over a given range of molecular weights can be expressed in a formula such as:

$$M = \frac{A}{\sqrt{H}}$$

where H is the hydrogen rate in parts per million, and A is some constant.

In other installations, it may be found that the relationship follows the relationship $$M = \frac{A}{H}$$

over very small ranges, and for that type of installation, the simpler formula would be utilized.

Once the empirical relationship, e.g., $$M = \frac{A}{\sqrt{H}}$$

has been determined, then the desired quantity of hydrogen can be usually determined by transposition:

$$H = \frac{A^2}{M^2}$$

where M is the molecular weight of the polymer, H is the hydrogen rate in PPM, and A is some constant.

Figure 2:
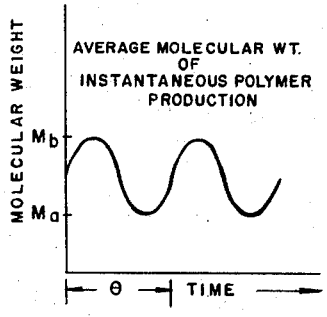
Figure 3:
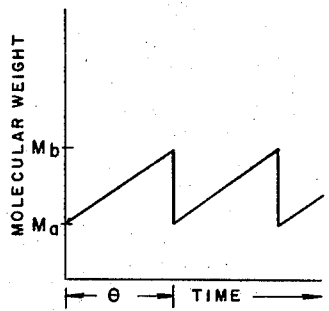
Figure 4:
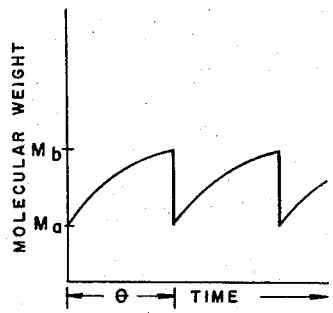

If $\theta$ is the time of one cycle, then the formulae for the variation of M with time corresponding to the patterns shown in FIGS. 2–4 are as follows:

In FIG. 2, the instantaneous average molecular weight is seen to follow a sinusoidal wave, represented by the equation:

$$M = \frac{(M_b + M_a)}{2} + \frac{(M_b - M_a)}{2} \sin 2\pi \left(\frac{t}{\theta}\right)$$

where $M_a$ and $M_b$ represent the minimum and maximum average molecular weights, respectively, and t is the point on the time axis.

Since $$H = \frac{A^2}{M^2}$$

the hydrogen feed rate will follow a pattern determined by the equation:

$$H = \frac{A^2}{\left[\frac{(M_b + M_a)}{2} + \frac{(M_b - M_a)}{2} \sin 2\pi \left(\frac{t}{\theta}\right)\right]^2}$$

Figure 2A:
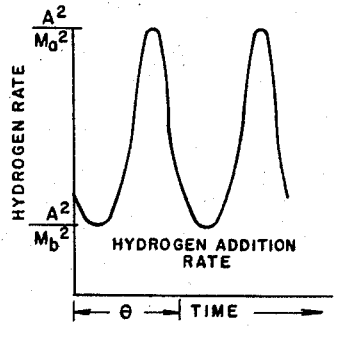

The resultant pattern of the hydrogen addition rate determined by this equation is shown in FIG. 2A. As will be seen, this pattern of hydrogen addition does not follow a sine wave as does the instantaneous molecular weight of the polymer being produced, but instead, is heavily weighted in favor of the higher rate of hydrogen addition.

Similarly, in the case of FIG. 3, in which the instantaneous average molecular weight follows a sawtooth wave, the mathematical expression for that curve is:

$$M = M_a + (M_b - M_a) \left(\frac{t}{\theta}\right)$$

and the hydrogen rate will be determined by the equation:

$$H = \frac{A^2}{\left[M_a + (M_b - M_a)\left(\frac{t}{\theta}\right)\right]^2}$$

where H, A, M, t and $\theta$ are the variables discussed above.

Figure 3A:
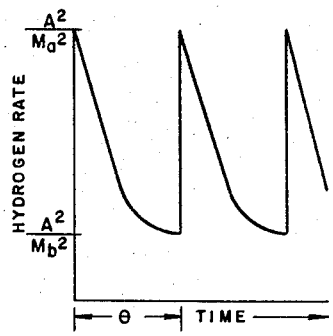
Figure 3B:
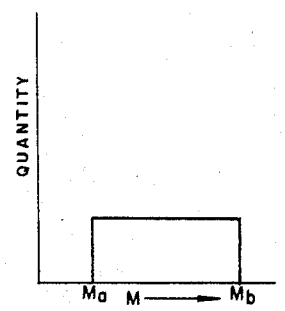

The pattern of this type of hydrogen addition is shown in FIG. 3A and is seen to be a type of inverse square function.

For a square root function of instantaneous molecular weights (FIG. 4), the molecular weight is expressed mathematically as:

$$M = M_a + (M_b - M_a) \sqrt{\left(\frac{t}{\theta}\right)}$$

and the hydrogen addition rate will then follow the pattern:

$$H = \frac{A^2}{\left[M_a + (M_b - M_a)\sqrt{\left(\frac{t}{\theta}\right)}\right]^2}$$

Figure 4A:
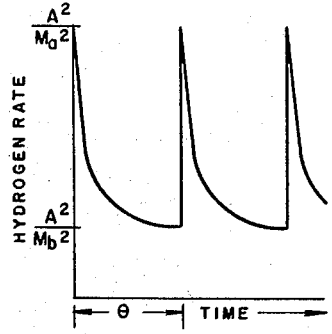

The pattern of hydrogen addition is shown in FIG. 4A and is seen to be similar to the pattern to be employed for a sawtooth distribution of instantaneous molecular weights, but weighted in favor of the lower rate of hydrogen addition.

Where the hydrogen addition rate itself follows a sawtooth wave, the distribution of molecular weights will be similar to that shown in FIG. 4 except that the molecular weights will be shifted in favor of the lower molecular weight and the distribution curve will be slightly dished.

Thus, it is seen that the pattern of hydrogen addition can be chosen for any given operating unit from the known relationship between hydrogen addition rate and the average molecular weight of instantaneous polymer production so that the desired pattern of instantaneous average molecular weight for polymer production can be obtained.

For every pattern of instantaneous average molecular weights of polymer produced, there is a corresponding pattern of hydrogen addition which must be employed, and this pattern of hydrogen addition can be easily determined by those skilled in the art from the empirically determined relationship between hydrogen addition rate and instantaneous average molecular weight for a given unit.

Thus, it is seen that, by recognizing that the instantaneous average molecular weight is closely and directly related to the instantaneous amount of hydrogen being introduced into the unit, the present inventors have adapted the phenomenon of hydrogen influence on polymer average molecular weight into a system whereby the distribution of molecular weights within a total polymer product can be controlled.

Figure 1A:
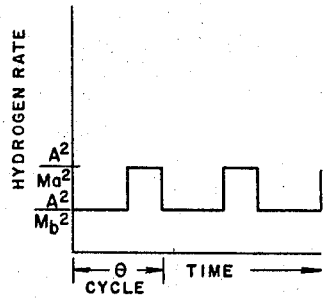
Figure 1B:
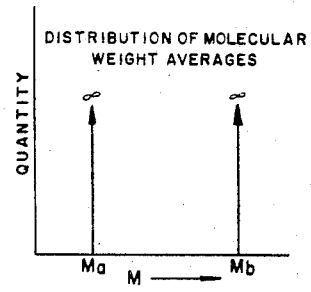

In FIG. 1A, the hydrogen is added in a square wave function, the rate varying from a minimum at $(A^2/M_b^2)$ to a maximum at $(A^2/M_a^2)$. The average molecular weight of instantaneous polymer production also follows this square-wave function as shown in FIG. 1. At $(A^2/M_b^2)$ the hydrogen is introduced at a constant minimum rate, and a high molecular weight product is produced (which is shown at $M_b$ in FIG. 1), while at the maximum constant level of hydrogen addition (shown at $A^2/M_a^2$) a low molecular weight product is obtained (shown at $M_a$ in FIG. 1). Two discrete polymer products are formed, as shown in FIG. 1B.

Figure 2B:
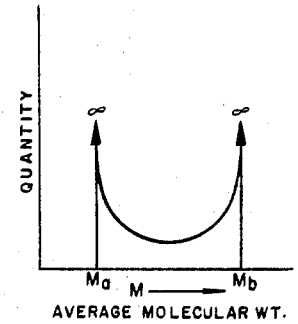

Referring now to FIG. 2 wherein the instantaneous molecular weight follows a sinusoidal wave, hydrogen is introduced at a rate (FIG. 2A) which changes from a maximum to a minimum in a continuous manner, each cycle following a pattern chosen to result in the sinusoidal wave form of instantaneous molecular weight and beginning and ending at the same hydrogen rate. It is seen (FIG. 2B) that a polymer is produced having not only the high and low average molecular weight components, but also a range of polymer average molecular weights intermediate to the two.

In FIG. 3 a sawtooth distribution of average molecular weights is produced by hydrogen addition rates following the pattern of FIG. 3A. It is seen (FIG. 3B) that a relatively homogeneous mixture of polymer is obtained which includes all intermediate molecular weights in the same concentration as the high and low molecular weights which are formed.

Figure 4B:
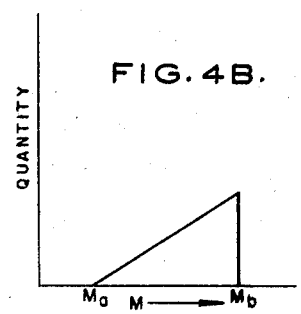

In FIG. 4 a square root-wave of average molecular weight of instantaneous polymer production is obtained by the hydrogen rates shown in FIG. 4A. A polymer is obtained which is weighted heavily in favor of molecular weights at the high end of the molecular weight curve (FIG. 4B).

Thus, it is seen that by varying the hydrogen addition rate during each of a number of repeated cycles, the molecular weight distribution in the final polymer product is controlled as desired.

From the above discussion it can be seen that the concept of the present invention is not limited to the production of polypropylene, but is extensible to any polymerization process utilizing the Ziegler polymerization catalyst, which is sensitive to chain transfer agents.

By Ziegler catalyst systems, it is meant to include those systems well known in the art as including $TiCl_3 \cdot 1/3AlCl_3$ or $TiCl_3$ plus $Al(C_2H_5)_3$ or $Al(C_2H_5)_2Cl$.

Suitable monomer charge stocks include all the alpha olefins such as ethylene, propylene, butene-1, pentene-1, hexene-1, etc., particularly the $C_2$ to $C_6$ alpha olefins either alone for homopolymers or in combinations for copolymers.

By chain transfer agents are meant those materials which are capable in any given system of terminating the polymerization growth of a given molecule without deactivating or killing the catalyst. The catalyst site is thereby available for further polymerization. The preferred chain transfer agent, of course, is hydrogen. Other suitable chain transfer agents are higher olefins, hydrogen chloride, diethyl aluminum hydride, triethyl aluminum, etc. Thus, in a propylene polymerization reaction, butene-1 could be employed as a chain transfer agent. Likewise, in the polymerization of any of the other alpha olefins, suitable other higher alpha olefins could be employed as chain transfer agents.

Generally, the polymerization reaction conditions will be those normally employed in the given polymerization reaction, and these conditions need not be modified to employ the present invention. As an example, in the polymerization of polypropylene, the reactor polymerization conditions can include a temperature of 110–210° F. (preferably 170° F.), a pressure which is sufficient to keep at least some part of all the reactants in the solvent (preferably 75 p.s.i.g.), and a residence time of 2 to 8 hours (preferably 3.6 hours).

In the polymerization reaction of propylene, as well as other alpha olefins, the cycle periods for the addition of the chain transfer agent will vary from a minimum which is limited by the response of the system, including the control equipment on the hydrogen feed line (probably about one minute minimum to a desirable maximum which is also determined by the system, and which preferably would run about the equivalent of the average residence time of the propylene in the reactor. This cycle period preferably will be about one hour.

The hydrogen (or other chain transfer agent) level during each cycle will depend upon the pattern which is chosen for the average molecular weight of instantaneous polymer production and the final average molecular weight desired, as well as the molecular weight which is desired at the maximum and the minimum period. Where a square-wave function is used, the minimum hydrogen may be 0, so that one component of the product will be a polyolefin (such as polypropylene) of an extremely high molecular weight. The hydrogen level for the maximum during each cycle will be at least 25 p.p.m. and can be as high as about 800 p.p.m. by weight, based on olefin monomer feed (e.g., propylene) in the reactor. The maximum rate is usually chosen to fall within the range of 300 to 800 p.p.m., and preferably will run about 330 p.p.m. In order to obtain a substantial difference in molecular weight distribution, the minimum hydrogen level should be substantially lower than the maximum, e.g., from 100 to 800 p.p.m. less than the maximum, although as little as 50 p.p.m. difference has some effect.

Each cycle will be divided into two portions where a square-wave function is used. That portion of the cycle wherein hydrogen is added at the maximum rate will vary from 0.05 to 0.9 of the cycle period, whereas the minimum hydrogen level will be employed within a range of from 0.1 to 0.95 of the cycle period. Preferably, the maximum hydrogen level will be used during 25% of the period of each cycle while the minimum hydrogen level will be employed during 75% of the cycle. This will produce a polymer which has a molecular weight distribution heavily favoring the high molecular weight polymer, with sufficient low molecular weight polymer included to modify the melt-flow characteristics and shear sensitivity of the polymer product. In order to illustrate that the polypropylene polymer produced by the present invention is superior to normal polypropylene, the following run was made. This run indicates the shear sensitivity has increased, and that the $M_w/M_n$ ratio is greater than that obtained in the normal powder. The higher $M_w/M_n$ ratio is indicative of the broader range of molecular weights which have been included in the polymer.

An exemplary composition of matter is a polypropylene having a melt flow index of about 5.0 g./10 min., a density of about 0.91, a tensile strength of about 4,800 p.s.i., a stiffness of about 130,000 p.s.i., and a $M_w/M_n$ ratio of about 10.8. This polymer contains about 94% heptane insolubles.

EXAMPLES

Example 1

The feed to a continuous polypropylene polymerization reactor was as follows:

|  | Wt., units/hr. |
|---|---|
| Propylene rate | 5.0 |
| Reactor diluent rate | 13.0 |
| $TiCl_3 \cdot 1/3\ AlCl_3$ catalyst rate | 0.0039 |
| Aluminum triethyl cocatalyst rate | 0.0022 |
| Hydrogen rate for 15 minutes | 0.0017 |
| Hydrogen rate for 45 minutes | 0.0 |

The average residence time in the reactor was 3.6 hours with an average propylene conversion of 87.5 weight percent. The hydrogen cycle of one hour was repeated throughout the run.

An analysis of the resulting polymer of broad molecular weight distribution compared with the same data for an ordinary polypropylene is as follows:

|  | Broad molecular weight distribution polypropylene | Usual polypropylene |
|---|---|---|
| Molecular weight ratio (weight average/number average) $M_w/M_n$ | 10.8 | 8.0 |
| Shear rate at 10 p.s.i. shear stress, 400° F., 1/sec | 215 | 225 |
| Shear sensitivity, shear rate at 20 p.s.i./shear rate at 10 p.s.i | 7.9 | 7.1 |

Example 2

The present invention was also utilized in producing an ethylene-propylene copolymer modified with a slight amount of norbornadiene. A number of comparative runs were made which employed varying amounts of hydrogen and varying time periods. A square-wave hydrogen addition rate was used. The results are compiled in Table I.

TABLE I.—ETHYLENE-PROPYLENE-NORBORNADIENE TERPOLYMER

| Run No. | $H_2$ max.[1] | | $H_2$ min.[1] | | Molecular weight distribution | | | |
|---|---|---|---|---|---|---|---|---|
|  | P.p.m. | Time (min.) | P.p.m. | Time (min.) | 0–80,000 | 80–120,000 | 120–180,000 | >180,000 |
| 1 | 42 | 5 | 0 | 15 | 30 | 14 | 30 | 26 |
| 2 | 26 | 15 | 0 | 5 | 18 | 14 | 39 | 29 |
| 3 | | Constant | | | 15 | 22 | 31 | 32 |

[1] P.p.m. based on monomer, total time of maximum and minimum give cycle time. Repeated cycles were employed.

Thus, by the "pulsed" (square-wave) introduction of hydrogen, it is seen that the amount of 0–80,000 molecular weight terpolymer can be doubled while maintaining other conditions virtually constant.

Having illustrated the present invention by a detailed description, and by specific examples, what is intended to be covered by Letters Patent should be limited not to the specific examples herein given, but rather by the appended claims.

We claim:

1. In the polymerization of at least one alpha olefin in a reaction zone in contact with a Ziegler catalyst, wherein the molecular weight of the polymer product is controlled by introducing a chain transfer agent into the reaction zone, the improvement of
controlling the molecular weight distribution in said polymer product by introducing said chain transfer agent into said reaction zone at a predetermined varying rate during repeated cycles, each cycle being no longer than one residence time,
while continuously introducing said alpha olefin into said reaction zone at a substantially constant rate.

2. A method in accordance with claim 1 wherein the chain transfer agent addition rate follows a square-wave function.

3. A method in accordance with claim 1 wherein the pattern of chain transfer agent addition rates is chosen to produce a sinusoidal pattern of average molecular weight of instantaneous polymer production.

4. A method in accordance with claim 1 wherein the pattern of chain transfer agent addition rates is chosen to produce a sawtooth pattern of average molecular weight of instantaneous polymer production.

5. A method in accordance with claim 1 wherein the pattern of chain transfer agent addition rates is chosen to produce a square-root pattern of average molecular weight of instantaneous polymer production.

6. A method in accordance with claim 1 wherein the chain transfer agent is hydrogen.

7. A method in accordance with claim 1 wherein the chain transfer agent is hydrogen and the hydrogen addition rate follows a square-wave function,
said square-wave function including a minimum of 0 and a maximum addition rate of 300 to 800 p.p.m. by weight based upon the alhpa olefin feed rate.

8. In the polymerization of a $C_2$ to $C_6$ alpha olefin in a reaction zone in contact with a Ziegler catalyst, wherein the molecular weight of the polymer product is controlled by introducing a chain transfer agent into the reaction zone, the improvement of
controlling the molecular weight distribution in said polymer product by introducing said chain transfer agent into said reaction zone at a predetermined varying rate during repeated cycles, each cycle being no longer than one residence time,
while continuously introducing said alpha olefins into said reaction zone at a substantially constant rate.

9. A method in accordance with claim 8 wherein the chain transfer agent is hydrogen.

10. A method in accordance with claim 9 wherein the hydrogen addition rate follows a square-wave function.

11. A method in accordance with claim 10 wherein the square-wave function includes a maximum addition rate and a minimum addition rate, the minimum addition rate being 0 and the maximum addition rate being from 300 to 800 p.p.m. based upon the alpha olefin feed rate.

12. In the polymerization of a $C_2$ to $C_6$ alpha olefin in a reaction zone in contact with a Ziegler catalyst, wherein the molecular weight of the polymer product is controlled by introducing hydrogen into the reaction zone, the improvement of
controlling the molecular weight distribution in said polymer product by introducing said hydrogen into the reaction zone at a rate varying in a predetermined manner between limits of 0 to 800 p.p.m. by weight based upon the olefin feed during repeated cycles, each cycle being no longer than one residence time,
while continuously introducing said alpha olefin into said reaction zone at a substantially constant rate.

13. A process in accordance with claim 12 wherein the hydrogen addition rate follows a square-wave function.

14. A method in accordance with claim 12 wherein the pattern of hydrogen addition rates is chosen to produce a sinusoidal pattern of average molecular weight of instantaneous polymer production.

15. A method in accordance with claim 12 wherein the pattern of hydrogen addition rates is chosen to produce a sawtooth pattern of the average molecular weight of instantaneous polymer product.

16. A method in accordance with claim 12 wherein the pattern of hydrogen addition rate is chosen to produce a square-root pattern of the average molecular weight of instantaneous polymer product.

17. In the polymerization of propylene in a reaction zone in contact with a solvent and a Ziegler catalyst, under polymerization conditions including a temperature of 110° F. to 210° F., a pressure allowing some of the monomer to be in solution, and a residence time of 2 to 8 hours, wherein the average molecular weight of the polymer product is controlled by introducing hydrogen into the reaction zone, the improvement of
controlling the molecular weight distribution in said polymer product by introducing said hydrogen into the reaction zone at a predetermined varying rate during repeated cycles,
said rate varying in a predetermined manner during each of said cycles from a minimum to a maximum, said cycles each being substantially equal in length, said cycle length varying from one minute to one residence time, while continuously introducing said propylene to said reaction zone at a substantially constant rate.

18. A method in accordance with claim 17 wherein the hydrogen addition rate follows a square-wave function, the minimum hydrogen addition rate being employed during 10% to 95% of each cycle, the maximum rate being employed during 5% to 90% of each cycle.

19. A method in accordance with claim 18 wherein the minimum rate is from 0 to 100 p.p.m. and the maximum is 300 to 400 p.p.m., based on propylene feed.

20. A method in accordance with claim 19 wherein the minimum rate is 0 and the maximum rate is 330 p.p.m.

21. In the polymerization of propylene in a reaction zone in contact with a solvent and a Ziegler catalyst under polymerization conditions including a temperature of about 170° F., a pressure of about 75 p.s.i.g., and a residence time of about 3.6 hours wherein the average molecular weight of the polymer product is controlled by introducing hydrogen into the reaction zone, the improvement of controlling the molecular weight distribution in said polymer product by introducing said hydrogen into the reaction zone at a predetermined varying rate during repeated cycles, said rate varying during each of said cycles in a predetermined manner from a minimum of 0 to a maximum of about 330 p.p.m. by weight based upon the propylene feed into the reactor, said cycles each being substantially equal in length, said cycle length being about one hour but no longer than one residence time, said hydrogen being added during each cycle length at a rate following a square-wave function, the minimum rate being employed during 75% of each cycle, the maximum rate being employed during 25% of each cycle, while continuously introducing said propylene into the reaction zone at a substantially constant rate.

No references cited.

JOSEPH L. SCHOFER, Primary Examiner

M. B. KURTZ, Assistant Examiner

U.S. Cl. X.R.

260—80.78, 88.2, 94.9, 897